US008667424B2

(12) United States Patent
Macfarlane et al.

(10) Patent No.: US 8,667,424 B2
(45) Date of Patent: Mar. 4, 2014

(54) METHOD OF SPREADING OUT AND DISPLAYING CLOSELY LOCATED POINTS OF INTEREST ON A PERSONAL NAVIGATION DEVICE

(75) Inventors: Rodney Macfarlane, Auckland (NZ); Richard Stanton, Auckland (NZ); Paul Ranford, Auckland (NZ)

(73) Assignee: Mitac International Corp., Kuei-Shan Hsiang, Tao-Yuan Hsien (TW)

( * ) Notice: Subject to any disclaimer, the term of this patent is extended or adjusted under 35 U.S.C. 154(b) by 876 days.

(21) Appl. No.: 12/547,489

(22) Filed: Aug. 26, 2009

(65) Prior Publication Data

US 2011/0055739 A1 Mar. 3, 2011

(51) Int. Cl.
*G06F 3/048* (2013.01)

(52) U.S. Cl.
USPC ............ 715/863; 715/835; 715/765; 345/173

(58) Field of Classification Search
USPC ......... 715/764, 765, 810, 835, 838, 702, 863; 345/173
See application file for complete search history.

(56) References Cited

U.S. PATENT DOCUMENTS

| | | | |
|---|---|---|---|
| 6,040,824 A | 3/2000 | Maekawa | |
| 6,295,062 B1 * | 9/2001 | Tada et al. | 715/835 |
| 6,392,661 B1 | 5/2002 | Tankersley | |
| 6,819,344 B2 * | 11/2004 | Robbins | 715/848 |
| 6,856,901 B2 | 2/2005 | Han | |
| 7,051,291 B2 * | 5/2006 | Sciammarella et al. | 715/838 |
| 7,131,060 B1 * | 10/2006 | Azuma | 715/260 |
| 7,730,401 B2 * | 6/2010 | Gillespie et al. | 715/702 |
| 2003/0182052 A1 | 9/2003 | DeLorme | |
| 2004/0243306 A1 | 12/2004 | Han | |
| 2004/0243307 A1 | 12/2004 | Geelen | |
| 2004/0254723 A1 | 12/2004 | Tu | |
| 2005/0255861 A1 | 11/2005 | Wilson | |
| 2006/0287027 A1 | 12/2006 | Hardisty | |
| 2007/0203645 A1 * | 8/2007 | Dees et al. | 701/212 |
| 2007/0219714 A1 | 9/2007 | Uchida | |

(Continued)

FOREIGN PATENT DOCUMENTS

| | | |
|---|---|---|
| CN | 101270998 A | 9/2008 |
| CN | 101271000 A | 9/2008 |

(Continued)

OTHER PUBLICATIONS

Andrew Watkins, "Method of displaying multiple points of interest on a personal navigation device", U.S. Appl. No. 12/236,507, filed Sep. 24, 2008.

*Primary Examiner* — Xiomar L Bautista
(74) *Attorney, Agent, or Firm* — Winston Hsu; Scott Margo (57) ABSTRACT

A method of displaying points of interest in a personal navigation device includes displaying a map on a display of the personal navigation device, receiving touch input at a touched position of the display, displaying points of interest located near the touched position, wherein the points of interest are represented by icons, each icon being connected to its location on the map with a line extending out from the touched position, and spreading out the icons around the touched position to separate the icons from each other, the spread out icons being displayed in a pattern around the touched position, wherein a length of the line connecting each icon to its location on the map is not directly proportional to a distance from the corresponding point of interest to the touched position.

20 Claims, 13 Drawing Sheets

(56) References Cited

U.S. PATENT DOCUMENTS

| | | |
|---|---|---|
| 2008/0076451 A1 | 3/2008 | Sheha |
| 2008/0109761 A1* | 5/2008 | Stambaugh ................ 715/853 |
| 2008/0158249 A1 | 7/2008 | Jarczyk |
| 2008/0180408 A1 | 7/2008 | Forstall |
| 2009/0005968 A1 | 1/2009 | Vengroff |
| 2009/0012955 A1 | 1/2009 | Chu |
| 2009/0100363 A1 | 4/2009 | Pegg |
| 2009/0113355 A1 | 4/2009 | Koo |
| 2009/0169060 A1 | 7/2009 | Faenger |
| 2009/0171576 A1 | 7/2009 | Kim |
| 2009/0259636 A1 | 10/2009 | Labrou |
| 2010/0077361 A1 | 3/2010 | Watkins |
| 2010/0280747 A1 | 11/2010 | Achthoven |

FOREIGN PATENT DOCUMENTS

| | | |
|---|---|---|
| DE | 10 2004 012 896 A1 | 10/2005 |
| DE | 10 2005 004 202 A1 | 8/2006 |
| DE | 10 2006 037 156 A1 | 9/2007 |
| DE | 10 2009 042 724 A1 | 6/2010 |
| EP | 1 128 284 A2 | 8/2001 |
| EP | 0 822 529 B1 | 6/2003 |
| JP | 2003114747 A | 4/2003 |
| JP | 2007199980 | 8/2007 |
| TW | M303429 | 12/2006 |
| TW | 200740224 | 10/2007 |
| TW | 200829880 | 7/2008 |
| WO | 0229726 A1 | 4/2002 |
| WO | 2006117437 A1 | 11/2006 |
| WO | 2007057696 A1 | 5/2007 |

\* cited by examiner

METHOD OF SPREADING OUT AND DISPLAYING CLOSELY LOCATED POINTS OF INTEREST ON A PERSONAL NAVIGATION DEVICE

BACKGROUND OF THE INVENTION

1. Field of the Invention

The invention relates to a method of displaying multiple points of interest on a personal navigation device, and more particularly, to a method for spreading out closely located points of interest to create a flower shape surrounding a selected position.

2. Description of the Prior Art

Global Positioning System (GPS) based navigation devices are well known and are widely employed as in-car navigation devices. Common functions of a navigation device include providing a map database for generating navigation instructions that are then shown on a display of the navigation device. These navigation devices are often mounted on or in the dashboard of a vehicle using a suction mount or other mounting means.

The term "navigation device" refers to a device that enables a user to navigate to a pre-defined destination. The device may have an internal system for receiving location data, such as a GPS receiver, or may merely be connectable to a receiver that can receive location data. The device may compute a route itself, or communicate with a remote server that computes the route and provides navigation information to the device, or a hybrid device in which the device itself and a remote server both play a role in the route computation process. Personal GPS navigation devices are not permanently integrated into a vehicle but instead are devices that can readily be mounted in or otherwise used inside a vehicle. Generally (but not necessarily), they are fully self-contained—i.e. include an internal GPS antenna, navigation software and maps and can hence plot and display a route to be taken.

One useful feature of personal navigation devices is the ability to list nearby points of interest. In rural areas, points of interest may be spread out far from each other, and can easily be shown on the display of the personal navigation device. However, when traveling through cities or other areas where there are many points of interest in close proximity to one another, there can be tens of points of interest located very close together. It is difficult to clearly show multiple points of interest that are in very close proximity to each other on the display of a personal navigation device. To deal with this problem, the prior art has used several different approaches for presenting information about points of interest to users of personal navigation devices.

One method used in the prior art is assigning different priority levels to different types of points of interest. For instance, an office building can be given a low priority while a hospital or a tourist attraction can be given higher priority. Once the priority levels have been established, the personal navigation device can be set to only display points of interest having a priority level equal or greater than a minimum priority. Otherwise, if there are still many points of interest meeting the minimum priority level, the personal navigation device will display only the points of interest with the greatest priority level.

One problem with the traditional approach to displaying points of interest is that if several points of interest occur at the same location or nearby locations, only one type of point of interest icon is drawn, which will be the icon representing the point of interest having the highest priority level. Another related problem is if a point of interest has been selected as a target destination for a user's trip, it is still not shown on the map if this type of point of interest was not enabled or not given high enough priority.

In addition, it is not often possible for users to narrow down categories to a finer granularity of point of interest types, such as selecting curry houses within the restaurant category, or selecting specific chains such as Starbucks™ within the coffee shop category.

Other problems come when the areas displayed on the map change when a user continues driving. As the map point of view changes, points of interest will appear and disappear from the map as their relative positions and priorities vary over time. Having icons constantly appear and disappear can be distracting to users.

Many personal navigation device manufacturers include more points of interest on a map than necessary for the average user because they want the user to appreciate all of the points of interest that the personal navigation device displays. However, most of the time, users are not interested in many of these points of interest. For example, restaurants, Automated Teller Machines (ATMs), etc. are only of interest when you need them, and are not required for every day driving.

After points of interest are displayed on the map, the user may find out more information about one of the points of interest by selecting it. However, if the point of interest that they are interested in is not shown as one of the displayed types of points of interest, they do not have this option. Instead, they may need to zoom in and move the map around in order to display the point of interest that they know is enabled. This may cause confusion as to why they are not able to find the specific point of interest on the map when they know that the point of interest is actually there.

Another problem comes when the user touches a map at a specific location containing multiple points of interest. In this case, the personal navigation device cannot tell which point of interest the user is interested in, and cannot show them the correct location details.

SUMMARY OF THE INVENTION

It is therefore one of the primary objectives of the claimed invention to provide a method for displaying points of interest on a personal navigation device in order to clearly display multiple points of interest that are located nearby a touched position.

According to an exemplary embodiment of the claimed invention, a method of displaying points of interest in a personal navigation device is disclosed. The method includes displaying a map on a display of the personal navigation device, receiving touch input at a touched position of the display, displaying points of interest located near the touched position, wherein the points of interest are represented by icons, each icon being connected to its location on the map with a line extending out from the touched position, and spreading out the icons around the touched position to separate the icons from each other, the spread out icons being displayed in a pattern around the touched position, wherein for each icon, a length of the line connecting the icon to its location on the map is not directly proportional to a distance from the corresponding point of interest to the touched position.

It is an advantage that the present invention provides a clear way to display multiple points of interest, even when the points of interest are located in very close proximity to each other. Icons representing the points of interest will automatically spread out so that the points of interest located near the touched position can easily be seen.

These and other objectives of the present invention will no doubt become obvious to those of ordinary skill in the art after reading the following detailed description of the preferred embodiment that is illustrated in the various figures and drawings.

DETAILED DESCRIPTION

The present invention aims to provide information about points of interest to a user in an unobtrusive manner. To accomplish this, by default very few point of interest icons will be shown on the map of the personal navigation device. Those points of interest that are shown should be of genuine interest, such as landmarks, tourist attractions, etc.

Figure 1:
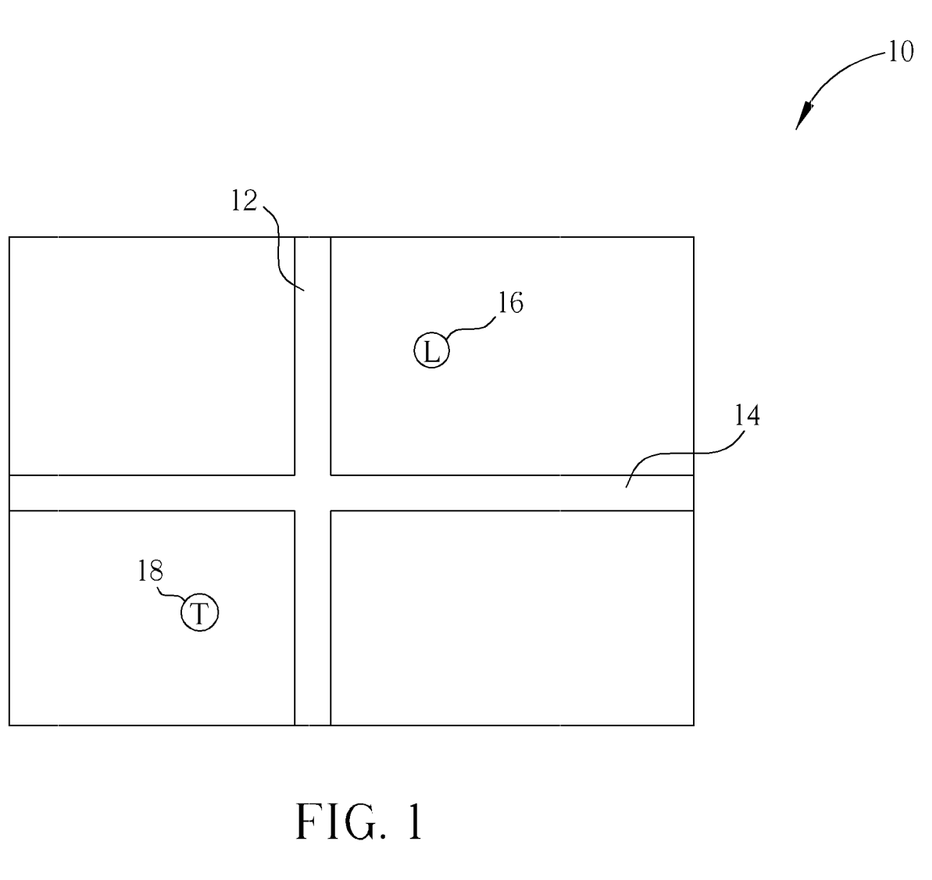
FIG. 1 illustrates a map showing roads and points of interest.

Please refer to FIG. 1. FIG. 1 illustrates a map 10 showing roads 12 and 14 and points of interest 16 and 18. Point of interest 16 corresponds to a landmark, whereas point of interest 18 corresponds to a tourist attraction. If the user wishes to find out more information about either of the points of interest 16 and 18, the user can touch or select one of them to see additional information. If there are many points of interested clustered together, it may be that an icon for one point of interest will block icons corresponding to other nearby points of interest. The present invention provides a way to see the hidden icons by letting the user touch the screen and see icons located near the position on the screen that was touched. The present invention only requires the user to touch a screen on which the map 10 is displayed. It is not necessary to use a mouse or other pointing device to move a cursor to a desired position.

Figure 2:
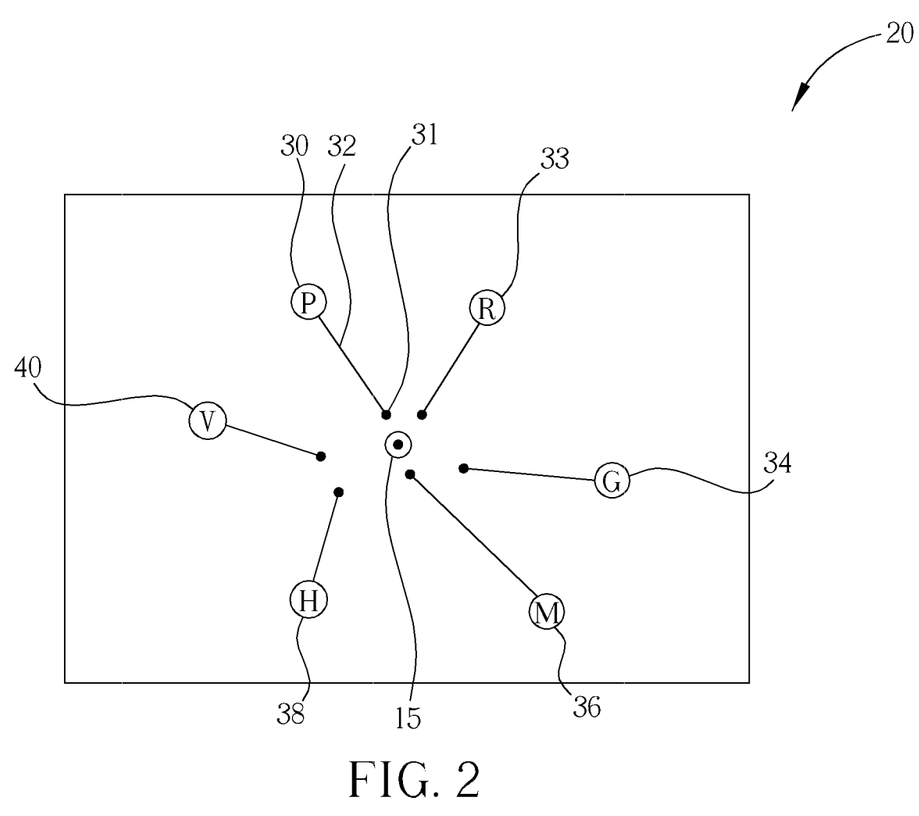
FIG. 2 illustrates another map showing points of interest located near a touched position of the map.

Please refer to FIG. 2. FIG. 2 illustrates another map 20 showing points of interest located near a touched position 15 of the map 20. When the user touches the touched position 15, icons representing points of interest located near the touched position 15 spread out around the touched position 15. Each point of interest is represented as an icon attached to its location point by a line. In order to make the icons easier to see, the icons are fanned out so that the user sees a cluster of spread out point of interest icons. The icons can be spread out in numerous ways, and FIG. 2 shows the icons being spread out in all directions in an irregular pattern around the touched position 15 so that the user can see the icons around the user's finger. In FIG. 2, icon 30 represents a parking lot located at location point 31. Icon 30 is attached to location point 31 by line 32. Other similar icons are also shown in FIG. 2, including icon 33 representing a restaurant, icon 34 representing a golf course, icon 36 representing a museum, icon 38 representing a hospital, and icon 40 representing a visitor's center. Although each of the icons 30, 33, 34, 36, 38, 40 has a corresponding location point and line connecting the icon to the location point, only the location point 31 and line 32 corresponding to icon 30 are numbered for enhancing the clarity of FIG. 2.

Figure 3:
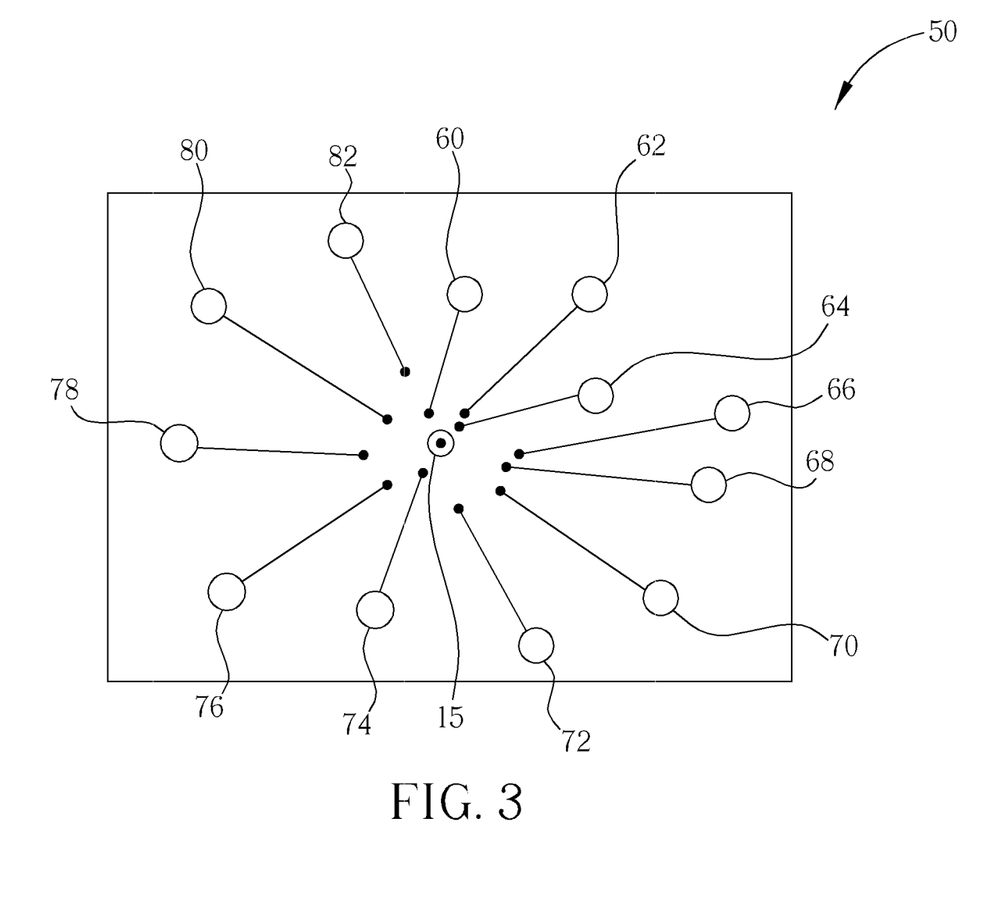
FIG. 3 illustrates another map showing a greater number of points of interest located near the touched position of the map.

Please refer to FIG. 3, which illustrates another map 50 showing a greater number of points of interest located near the touched position 15 of the map 50. If a large number of points of interest are clustered together, then more icons will spread out around the touched position when the user touches the touched position 15. It may be possible that some icons will not be displayed if the map is already showing a maximum number of icons (such as 50 icons). In FIG. 3 icons 60, 62, 64, 66, 68, 70, 72, 74, 76, 78, 80 are all shown as having corresponding location points near touched position 15. As the number of icons increases, the icons will spread out slightly farther from the user's finger so that the cluster of icons starts to become a cloud or a flower. The icons can be displayed in a symmetrical pattern or in an irregular pattern around the touched position 15. The icons can also form a variety of other shapes and patterns, as will be explained in greater detail below.

When the cluster of icons gets too close together, some icons will move farther away from the touched position 15 in order to stagger the icons and allow for more icons to be shown. When this occurs, icons corresponding to location points that are farther from the touched position 15 may move farther out than icons that correspond to location points closer to the touched position 15. For example, in FIG. 3, icon 64 is located closer to the touched position 15 than icons 62 and 66 since the location point corresponding to icon 64 is closer than the location points corresponding to icons 62 and 66. However, the distance between each location point and its corresponding icon is not necessarily directly proportional to the distance from the corresponding point of interest to the touched position 15.

Once the user's finger is removed from the screen and the touched position 15 is no longer being pressed, the displayed icons are shown for a short period of time. This period of time is long enough for users to inspect the displayed points of interest and tap on specific icons to get additional details about the selected point of interest, such as the detailed address and the phone number of the selected point of interest. In addition to getting more details about the selected point of interest when tapping on an icon, the user can also be presented with the option of receiving navigation instructions that take the user directly to the selected point of interest. If the user selects this option, the user can be guided to the point of interest directly without having to enter another address manually. After a timeout period, the icons will gradually fade away or will pop like bubbles. When the screen is first touched, a graphical context menu will also appear. This provides some key functions that will operate on the selected position or the selected point of interest. Some of these functions include Search Nearby, Online Search Nearby, Navigate To, Set As Start, Avoid, Re-center, etc.

The key to the usability of this invention lies in the quality of the graphics and animation. Each icon that appears needs to be placed in an appropriate position on the screen. In one embodiment, the icon is shown on a radial line centered on the touched position 15 and passing through the location point of the point of interest. If the locations of two points of interest are close together or are on the same radius, the icons will need to adjust their positions to allow both to be shown. This positioning can be achieved by having all of the other icons shuffle along slightly. This motion can also be animated so each icon appears in turn and then shifts along to allow new icons to appear. It is important that the icons do not suddenly jump around, and instead they should move like particles in water spreading out to use the space optimally.

The underlying layout positioning algorithm can be described as follows. If there are no space constraints for the icons, a construction line can be drawn from the touched position 15 to the location point of the point of interest and continued radially a short distance to position the icon. If two icons overlap or the lines would cross each other, then the length of the line connecting the location point of the point of interest and its corresponding icon can be lengthened radially. The point of interest that is farthest away from the touched position 15 should be chosen to have its corresponding line lengthened. The farther away the point of interest is from the touched position 15, the longer the line can be. Otherwise, a repulsive factor can be applied to each icon so that they will separate themselves evenly. This may require the icons to move radially towards or from the touched position 15 or move tangentially around the touched position 15.

Figure 4:
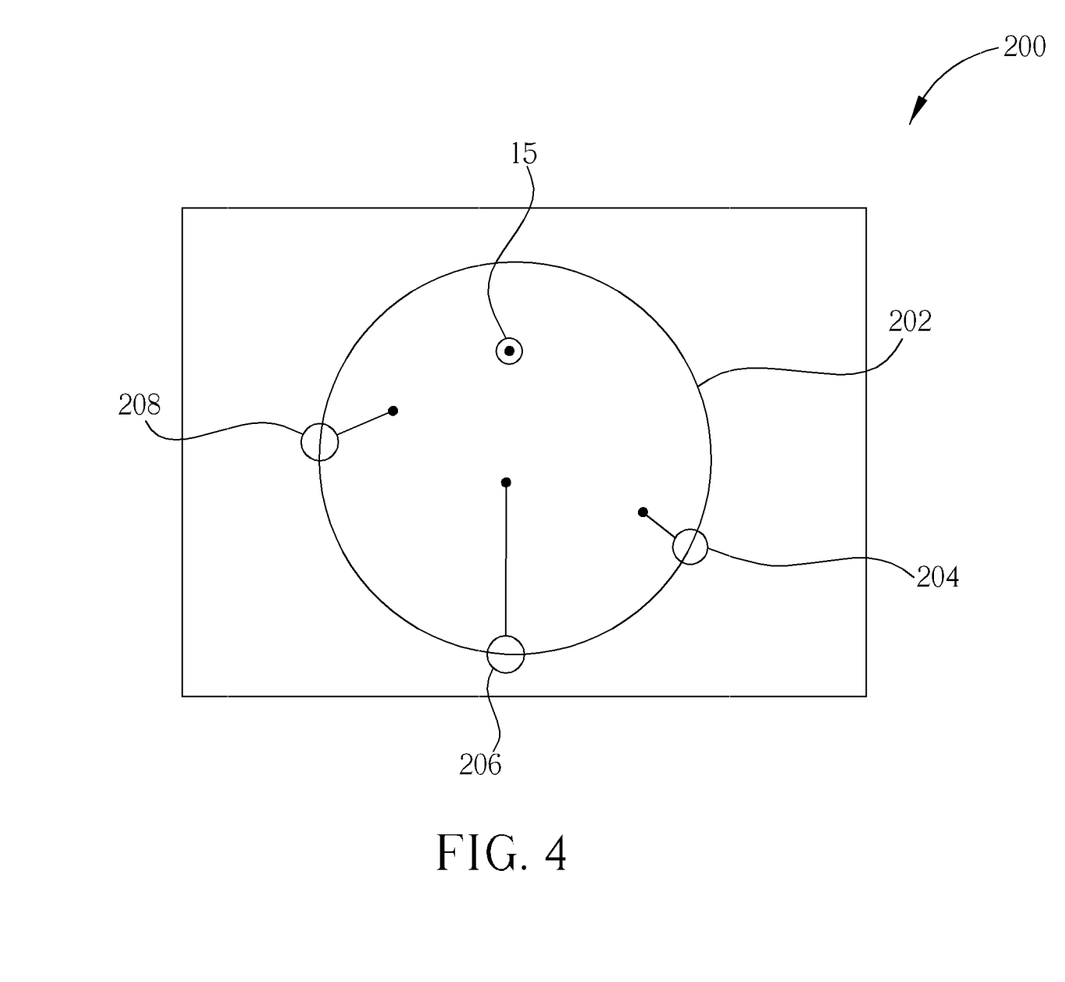
FIG. 4 is shows a map having a circular pattern for displaying icons in which a location of the touched position is not located in the center of circle.

A variety of other embodiments can be used for different shapes and patterns used to display the icons corresponding to points of interest near a touched position. Please refer to FIG. 4. FIG. 4 is shows a map 200 having a circular pattern for displaying icons in which a location of the touched position 15 is not located in the center of circle 202. Icons 204, 206, and 208 are shown as being displayed on the circle 202, and the touched position 15 is located somewhere off-center in the circle 202. The circle 202 can be shown or can be made invisible when displaying the icons 204, 206, and 208.

Figure 5:
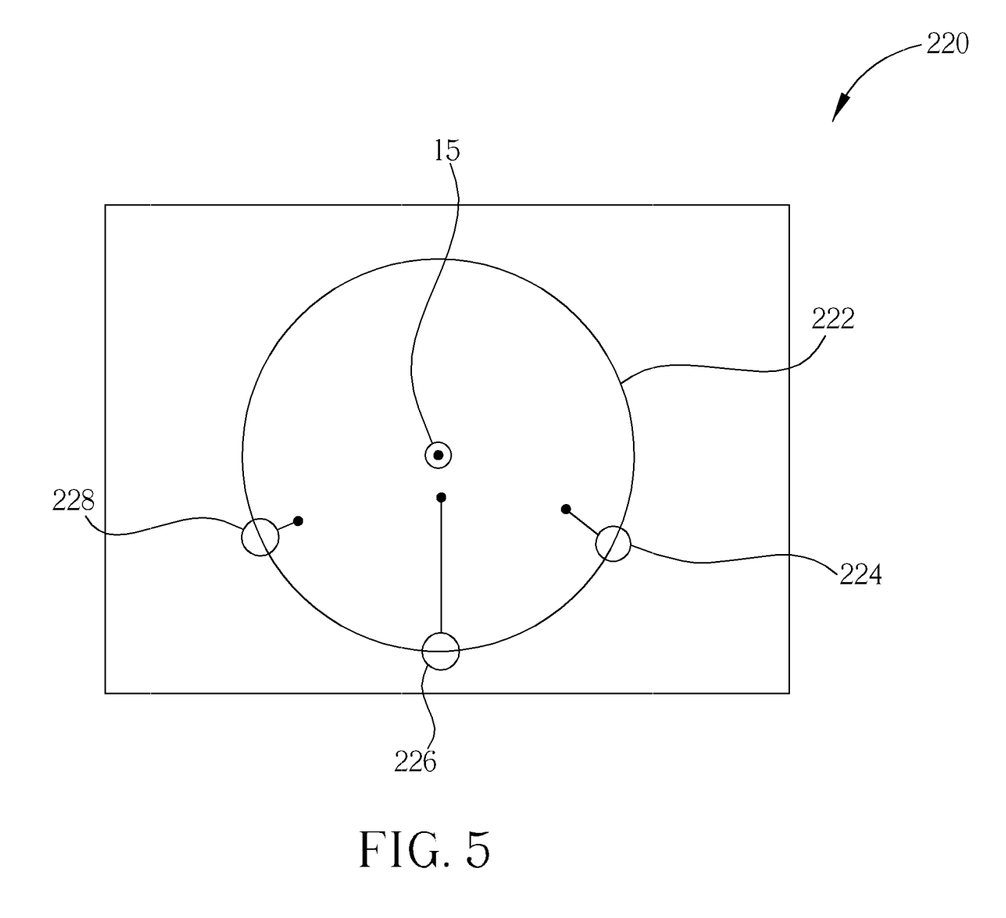
FIG. 5 is shows a map having a circular pattern for displaying icons in which a location of the touched position is located in the center of circle.

Please refer to FIG. 5. FIG. 5 is shows a map 220 having a circular pattern for displaying icons in which a location of the touched position 15 is located in the center of circle 222. Icons 224, 226, and 228 are shown as being displayed on the circle 222, and a distance between each icon and its corresponding location point is not directly proportional to the distance from the corresponding point of interest to the touched position 15.

Figure 6:
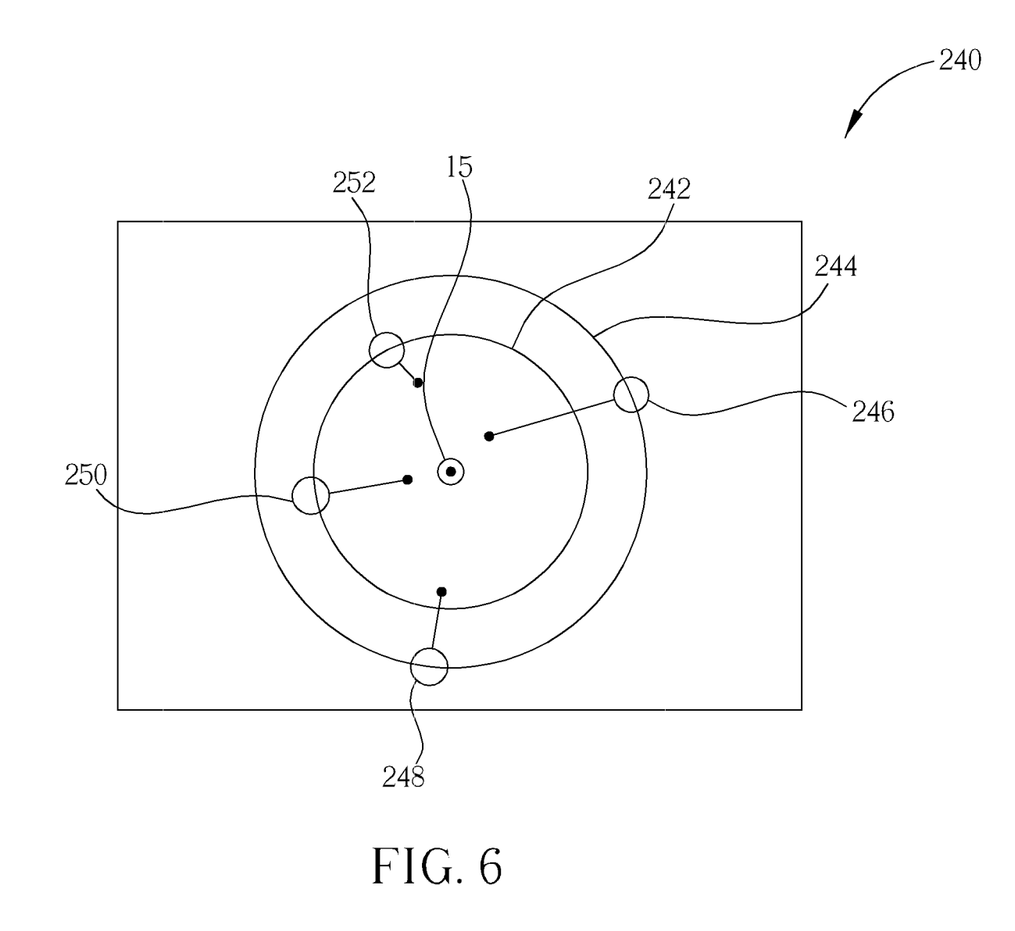
FIG. 6 is shows a map having a concentric circular pattern for displaying icons in which a location of the touched position is located in the center of concentric circles.

Please refer to FIG. 6. FIG. 6 is shows a map 240 having a concentric circular pattern for displaying icons in which a location of the touched position 15 is located in the center of circles 242 and 244. Icons 246 and 248 are shown as being displayed on the circle 244, and icons 250 and 252 are shown as being displayed in the circle 242. A distance between each icon and its corresponding location point is not directly proportional to the distance from the corresponding point of interest to the touched position 15.

Figure 7:
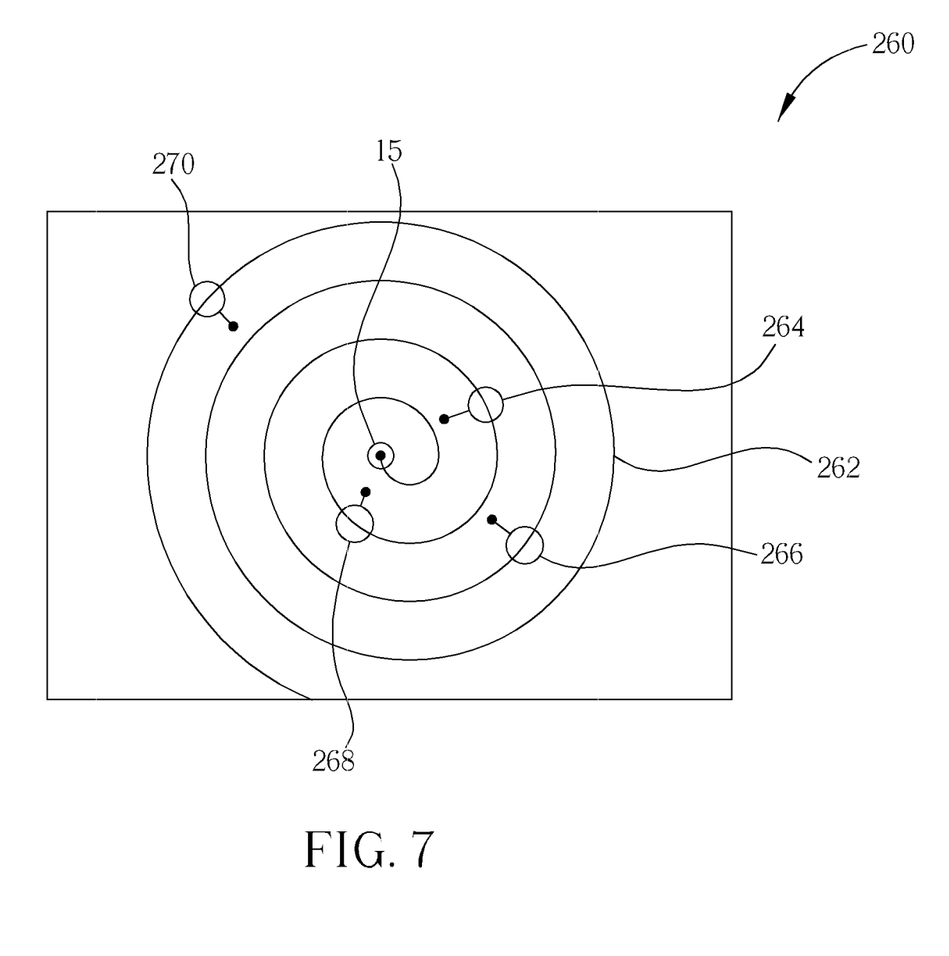
FIG. 7 is shows a map having a spiral line pattern for displaying icons in which a location of the touched position is located in a spiral line.

Please refer to FIG. 7. FIG. 7 is shows a map 260 having a spiral line pattern for displaying icons in which a location of the touched position 15 is located in a spiral line 262. Icons 264, 266, 268, and 270 are shown as being displayed on the spiral line 262. As shown, each icon can be located on a section of the spiral line 262 closest to the location point corresponding to the icon, but this is not a requirement.

Figure 8:
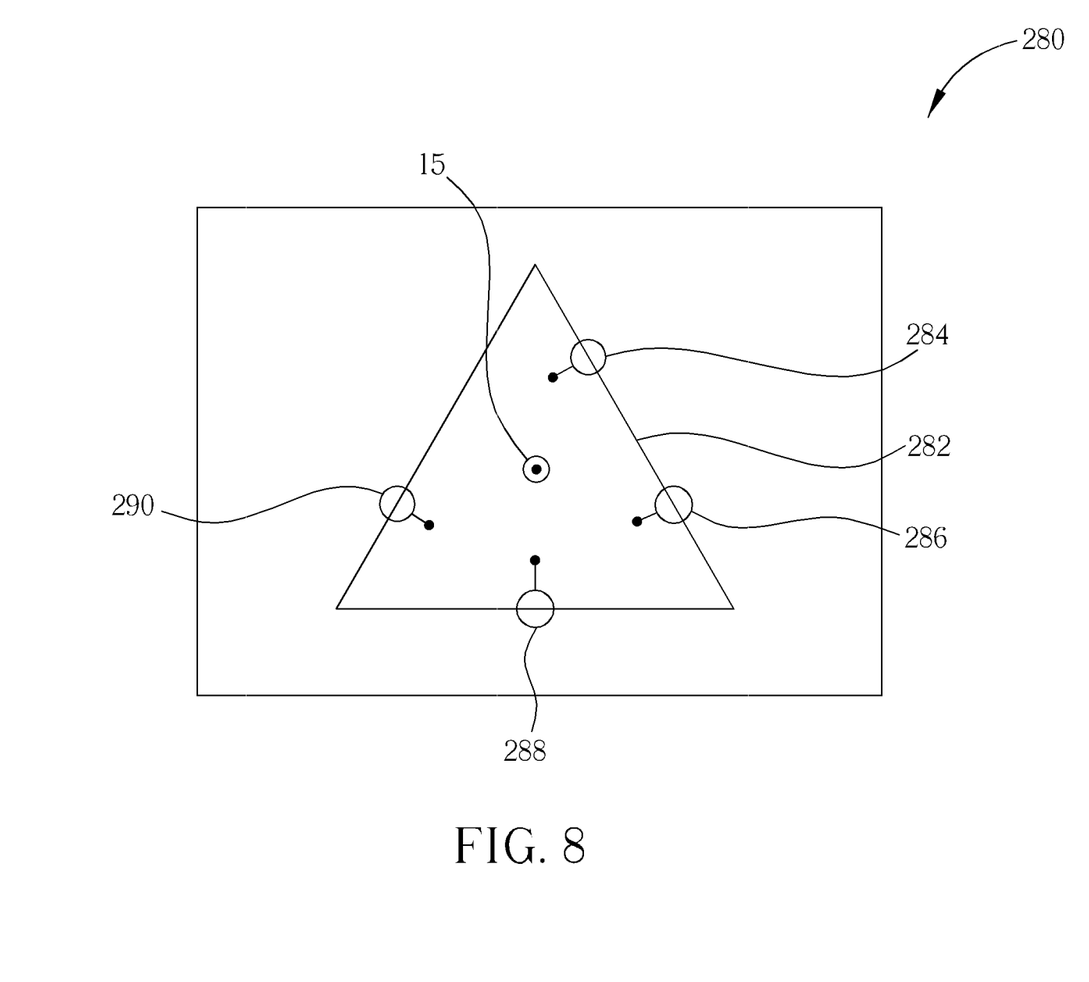
FIG. 8 is shows a map having a polygon pattern for displaying icons in which a location of the touched position is located in a polygon.

Please refer to FIG. 8. FIG. 8 is shows a map 280 having a polygon pattern for displaying icons in which a location of the touched position 15 is located in a polygon 282. In this case, a triangle is shown, but any type of polygon can be used, including regular polygons as well as irregular polygons. Icons 284, 286, 288, and 290 are shown as being displayed on the polygon 282. The location of the touched position 15 can also be located outside of the polygon 282, with the icons 284, 286, 288, and 290 still being displayed on the polygon 282.

Figure 9:
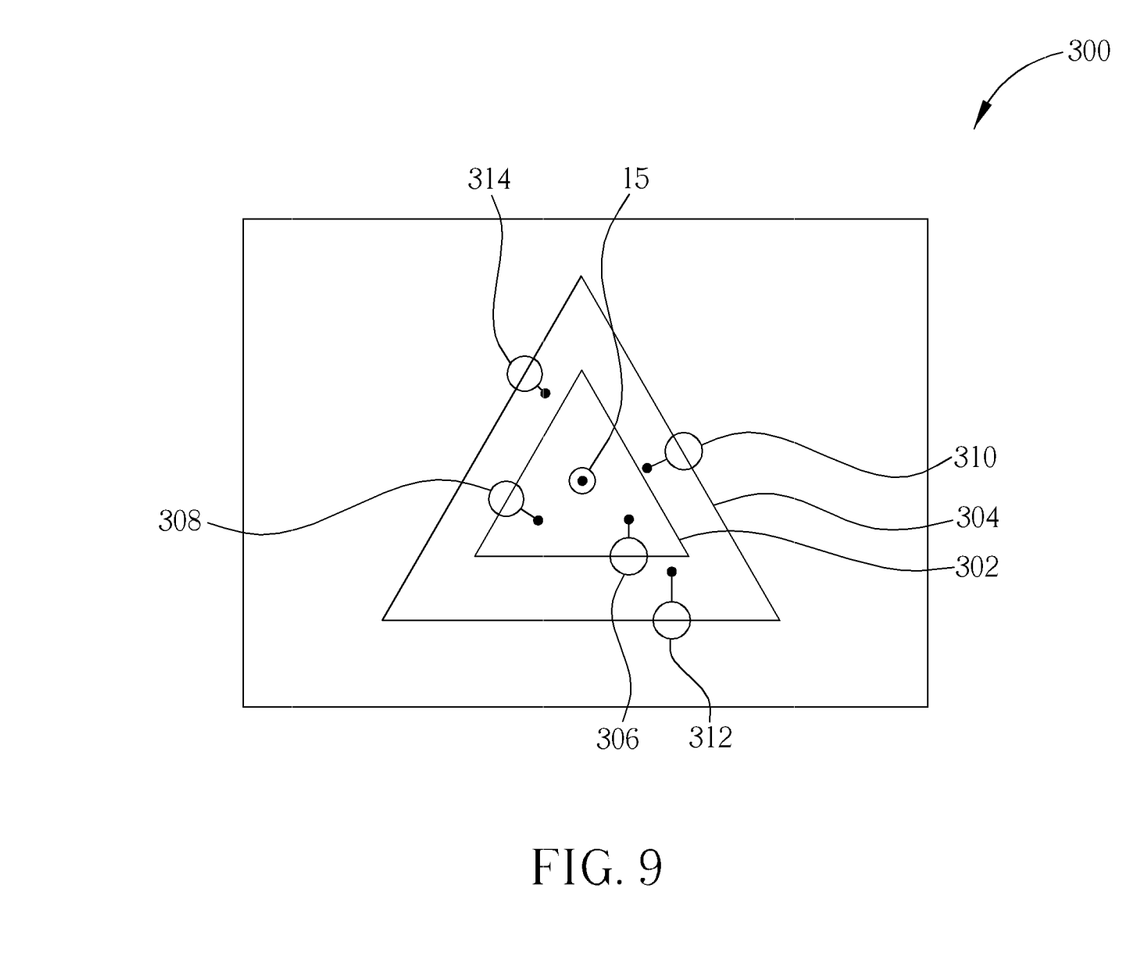
FIG. 9 is shows a map having a concentric polygon pattern for displaying icons in which a location of the touched position is located in concentric polygons.

Please refer to FIG. 9. FIG. 9 is shows a map 300 having a concentric polygon pattern for displaying icons in which a location of the touched position 15 is located in concentric polygons 302, 304. In this case, concentric triangles are shown, but any type of polygon can be used, including regular polygons as well as irregular polygons. Icons 306 and 308 are shown as being displayed on polygon 302, and icons 310, 312, 314 are shown as being displayed on the polygon 304.

Figure 10:
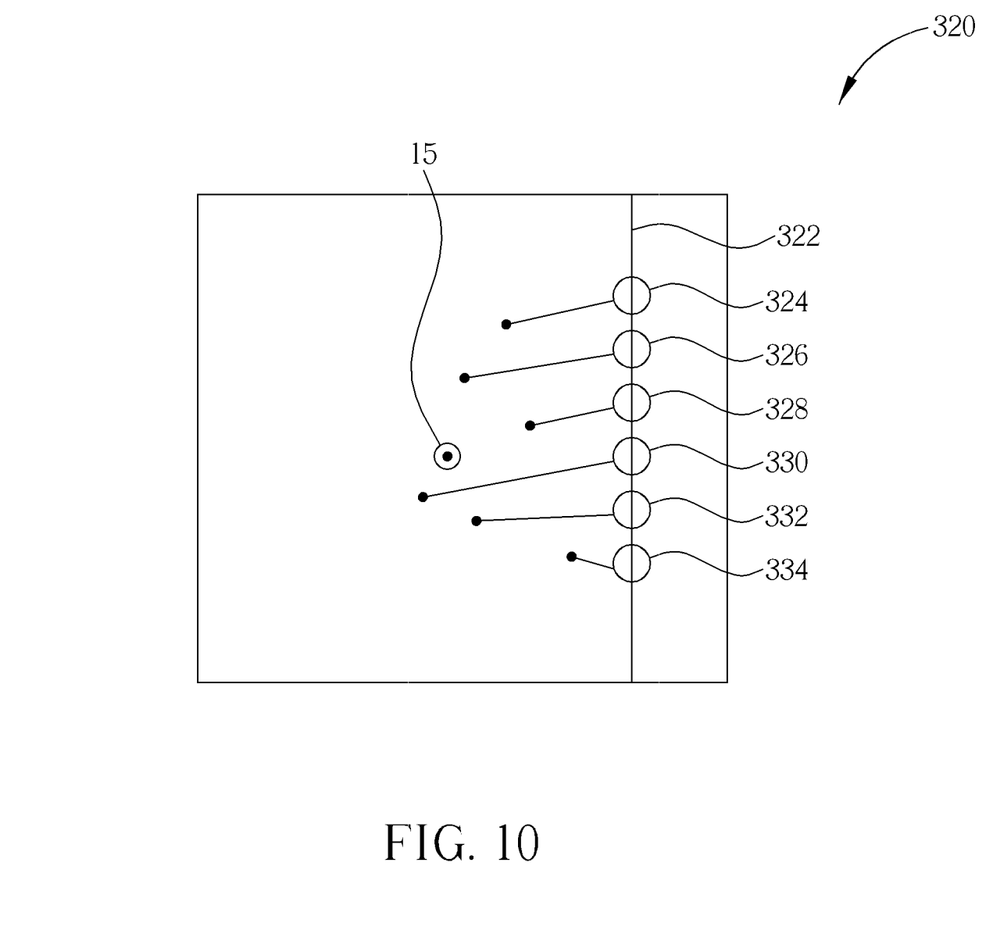
FIG. 10 is shows a map having a straight line pattern for displaying icons in which icons are shown as being displayed on the straight line.
Figure 11:
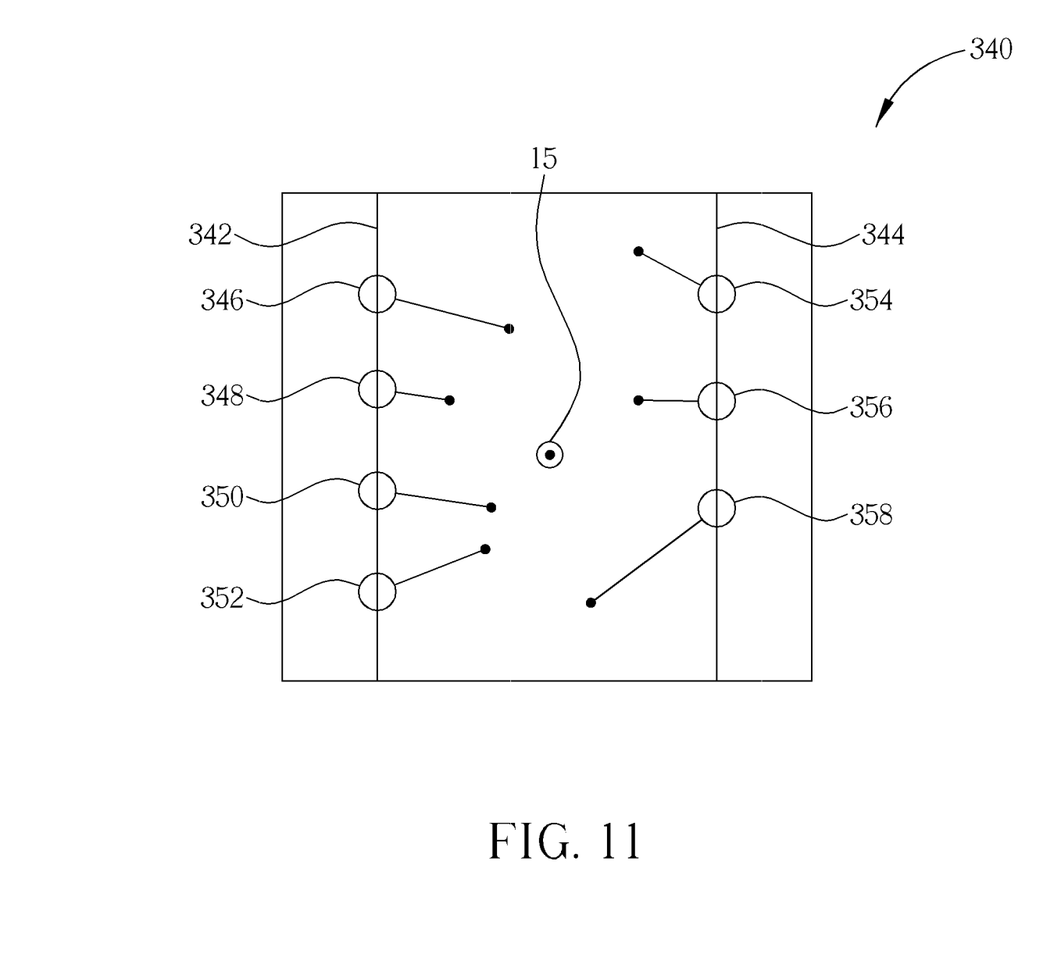
FIG. 11 is shows a map having a pattern with a plurality of straight lines for displaying icons in which icons are shown as being displayed on the straight line and icons are shown as being displayed on the straight line.

Please refer to FIG. 10. FIG. 10 is shows a map 320 having a straight line pattern for displaying icons in which icons 324, 326, 328, 330, 332, and 334 are shown as being displayed on the straight line 322. Please refer to FIG. 11. FIG. 11 is shows a map 340 having a pattern with a plurality of straight lines 342, 344 for displaying icons in which icons 346, 348, 350, 352 are shown as being displayed on the straight line 342 and icons 354, 356, 358 are shown as being displayed on the straight line 344.

Figure 12:
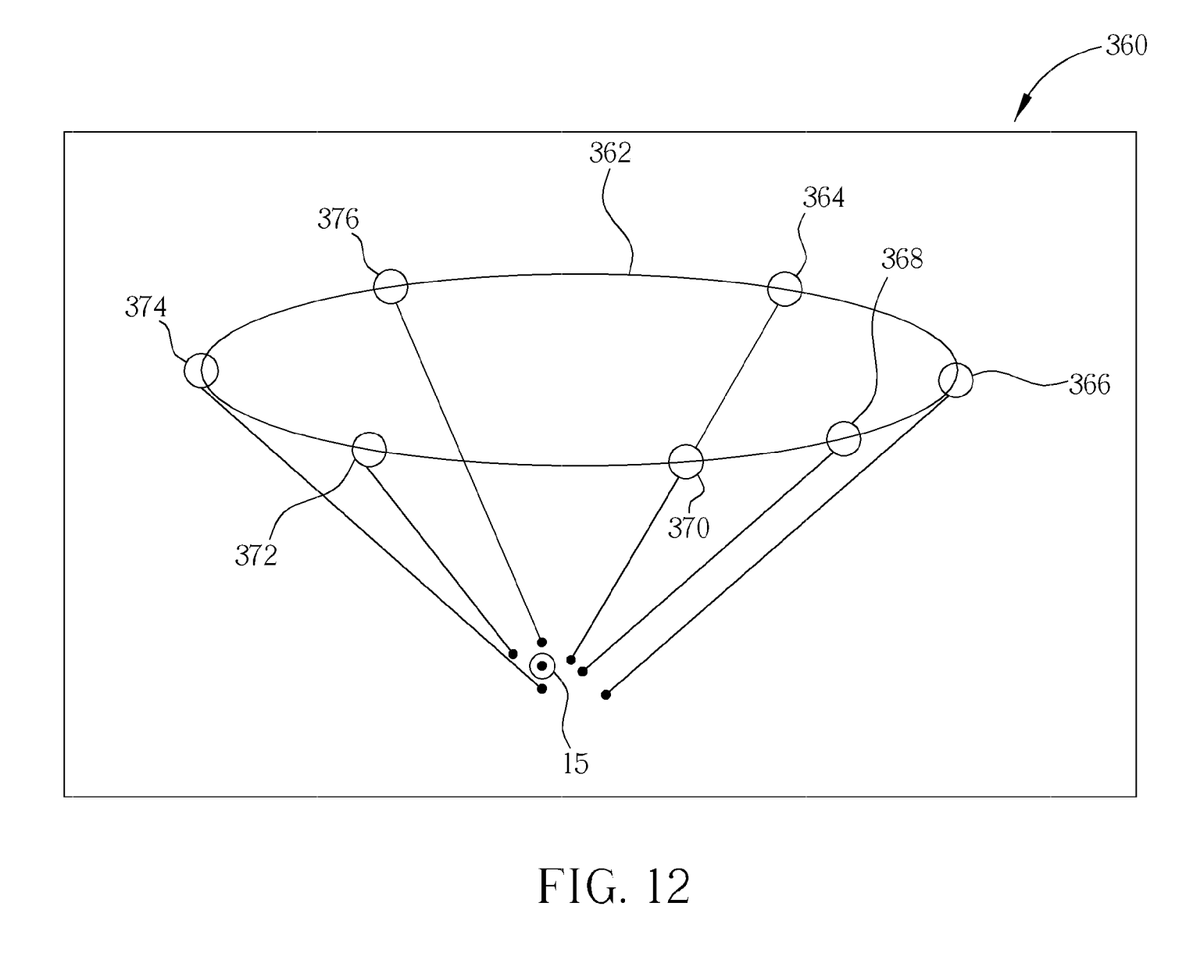
FIG. 12 is shows a map having an elliptical pattern for displaying icons in which a location of the touched position is not located within ellipse. Icons are shown as being displayed on the ellipse.

Please refer to FIG. 12. FIG. 12 is shows a map 360 having an elliptical pattern for displaying icons in which a location of the touched position 15 is not located within ellipse 362. Icons 364, 366, 368, 370, 372, 374, 376 are shown as being displayed on the ellipse 362. Although the ellipse 362 is positioned such that the touched position 15 is not within the ellipse 362, the ellipse 362 could also be positioned such that the touched position 15 is within the ellipse 362.

Figure 13:
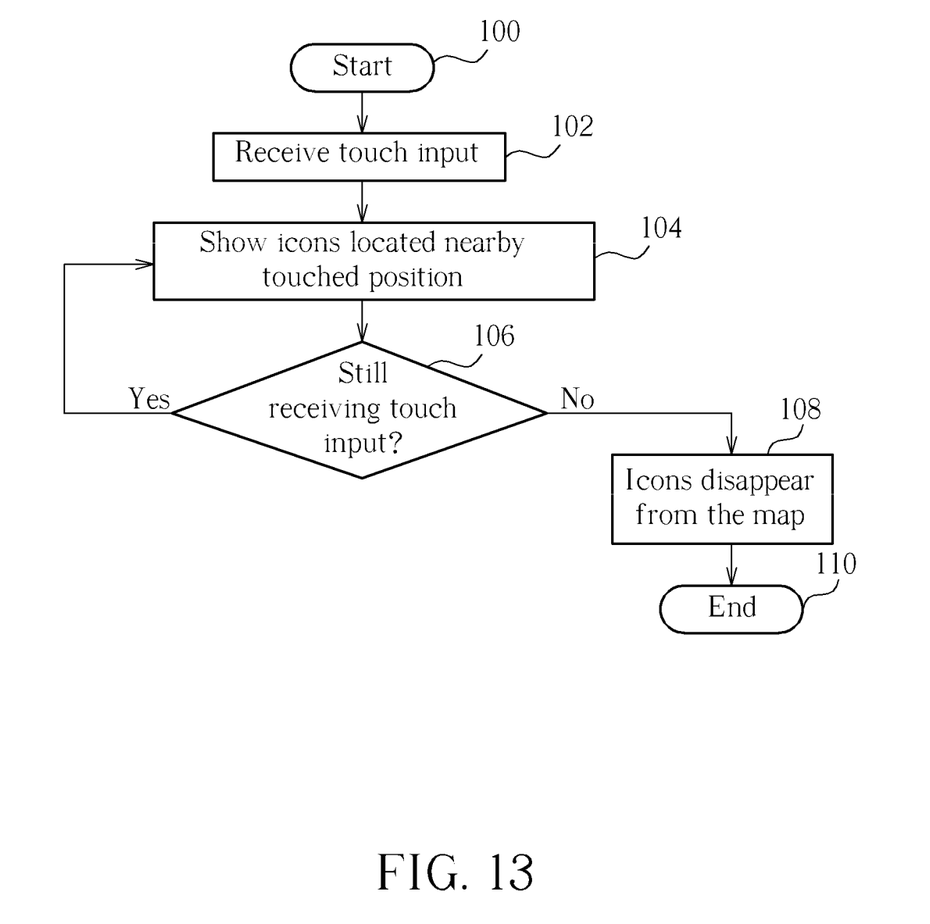
FIG. 13 is a flowchart illustrating the present invention method for displaying points of interest in a personal navigation device according to the present invention method.

Please refer to FIG. 13. FIG. 13 is a flowchart illustrating the present invention method for displaying points of interest in a personal navigation device according to the present invention method. Steps contained in the flowchart will be explained below.

Step 100: Start.

Step 102: Receive touch input from the user at the touched position 15.

Step 104: Show icons located near by the touched position and spread out displayed icons to make them easier to see.

Step 106: Determine if touch input is still being received at the touched position 15. If so, go back to step 104. If not, go to step 108.

Step 108: Icons gradually disappear from the map after a predetermined period of time has elapsed since the user stopped pressing the touched position 15.

Step 110: End.

The present invention also provides a way to limit icons being displayed to only those icons corresponding to selected types of points of interest. These selected types of points of interest can also be given priority levels, such that additional types of points of interest with lower priority levels are selected for the as the touch input continues to be received.

In summary, the present invention provides a clear way to display multiple points of interest, even when the points of interest are located in very close proximity to each other. Icons representing the points of interest will automatically spread out so that the points of interest located within the radius can easily be seen.

Those skilled in the art will readily observe that numerous modifications and alterations of the device and method may be made while retaining the teachings of the invention.

What is claimed is:

1. A method of displaying points of interest in a personal navigation device, the method comprising:
   displaying a map on a display of the personal navigation device;
   receiving touch input at a touched position of the display;
   displaying points of interest located near the touched position which were previously hidden before receiving touch input at the touched position, wherein the points of interest are represented by icons, each icon being connected to its location on the map with a line extending out from the touched position; and
   spreading out the icons around the touched position to separate the icons from each other, the spread out icons being displayed in a pattern around the touched position, wherein for each icon, a length of the line connecting the icon to its location on the map is not directly proportional to a distance from the corresponding point of interest to the touched position.

2. The method of claim 1, wherein as the number of displayed icons increases, the icons spread out away from the touched position.

3. The method of claim 1 further comprising stopping displaying additional icons when the number of displayed icons is greater than an upper threshold.

4. The method of claim 1 further comprising displaying icons for a predetermined time period after the touch input is no longer received.

5. The method of claim 4 further comprising controlling icons to fade away gradually after the predetermined time period has elapsed.

6. The method of claim 4 further comprising controlling icons to pop and disappear after the predetermined time period has elapsed.

7. The method of claim 1, wherein positions of icons shift to avoid overlapping with other icons.

8. The method of claim 1, wherein positions of icons shift to prevent the lines that connect icons to their respective locations on the map from intersecting with each other.

9. The method of claim 1 further comprising:
   receiving touch input directed to a displayed icon; and
   displaying additional information about the point of interest corresponding to the displayed icon for which touch input has been received.

10. The method of claim 1, wherein the pattern that the icons are displayed in is a circle in which a location of the touched position on the map is at a location other than the center of the circle, the icons being positioned on a circumference of the circle.

11. The method of claim 1, wherein the pattern that the icons are displayed in is a circle or a plurality of concentric circles, each of the icons being positioned on a circumference of one circle.

12. The method of claim 1, wherein the pattern that the icons are displayed in is a spiral line, each of the icons being positioned on the spiral line.

13. The method of claim 1, wherein the pattern that the icons are displayed in is a polygon, each of the icons being positioned on a perimeter of the polygon.

14. The method of claim 1, wherein the pattern that the icons are displayed in is a polygon in which a location of the touched position on the map is not located within the polygon, the icons being positioned on a perimeter of the polygon.

15. The method of claim 1, wherein the pattern that the icons are displayed in is a plurality of concentric polygons, each of the icons being positioned on a perimeter of one of the plurality of concentric polygons.

16. The method of claim 1, wherein the pattern that the icons are displayed in is a straight line, each of the icons being positioned on the straight line.

17. The method of claim 1, wherein the pattern that the icons are displayed in is a plurality of straight lines, each of the icons being positioned on one of the plurality of straight lines.

18. The method of claim 1, wherein the pattern that the icons are displayed in is an ellipse in which a location of the touched position on the map is not located within the ellipse, the icons being positioned on a circumference of the ellipse.

19. The method of claim 1, wherein displaying points of interest located near the touched position comprises displaying points of interest located near the touched position when receiving touch input.

20. The method of claim 1, wherein displaying points of interest located near the touched position comprises displaying points of interest located near the touched position in response to receiving touch input at the touched position.

* * * * *